United States Patent [19]

Lim et al.

[11] 4,233,347

[45] Nov. 11, 1980

[54] PROCESS FOR REINFORCING STRUCTURALLY FRAGILE INORGANIC FABRICS

[75] Inventors: Hong S. Lim, Agoura; Howard H. Rogers, Culver City; Scott A. Verzwyvelt, Thousand Oaks, all of Calif.

[73] Assignee: Hughes Aircraft Company, Culver City, Calif.

[21] Appl. No.: 948,119

[22] Filed: Oct. 2, 1978

[51] Int. Cl.$^3$ .................. B05D 3/00; B05D 1/18; B05D 3/02; H01M 2/16
[52] U.S. Cl. .................. 427/352; 427/353; 427/354; 427/385.5; 427/430.1; 429/251
[58] Field of Search ............ 427/246, 352, 353, 354, 427/385.5, 430.1; 429/251; 204/296

[56] References Cited

U.S. PATENT DOCUMENTS

| | | | |
|---|---|---|---|
| 3,100,721 | 8/1963 | Holden | 427/246 |
| 3,190,766 | 6/1965 | Yuan | 427/246 |
| 3,429,727 | 2/1969 | Hochberg | 427/246 X |
| 3,647,554 | 3/1972 | Arrance et al. | 429/251 X |
| 3,749,604 | 7/1973 | Langer et al. | 429/251 X |
| 3,861,963 | 1/1975 | Arrance et al. | 429/251 |
| 4,098,930 | 7/1978 | Nakayama et al. | 427/246 |

*Primary Examiner*—Michael R. Lusignan
*Attorney, Agent, or Firm*—B. T. Hogan, Jr.; W. H. MacAllister

[57] ABSTRACT

Chemically stable polymers in aqueous alkaline solutions are dissolved in a strongly polar solvent, thoroughly dispersed from this solvent into and throughout the interstices of porous inorganic fabrics and subsequently separated from said solvent by precipitation to provide a homogeneous reinforcement of the structural properties of said fabrics.

10 Claims, No Drawings

PROCESS FOR REINFORCING STRUCTURALLY FRAGILE INORGANIC FABRICS

The Government has rights in this invention pursuant to Contract No. F33615-75-C-2049 awarded by the United States Air Force.

RELATED APPLICATIONS

U.S. Application Ser. No. 914,461, filed June 12, 1978, by Applicant Howard H. Rogers discloses a blotting and drying technique for the preparation of a polymer reinforced Zircar cloth battery separator. As will be seen below, the process of the present application is capable of producing separators which are, in some respects, superior to the separators of Ser. No. 914,461.

FIELD OF THE INVENTION

This invention relates generally to methods for reinforcing inorganic fabrics and more particularly to a method for reinforcing zirconium oxide cloth for use as a separator in an alkaline storage battery.

BACKGROUND OF THE INVENTION

An alkaline storage battery, such as a nickel-cadmium or a nickel-hydrogen battery, requires a separator having good chemical stability against the electrolyte, good mechanical strength, good wettability in the electrolyte, good electrolyte retention, good gas permeability through the separator, good electrolyte reservoir capability, and a high melting point. A separator having all of the desired properties was presently not available prior to Ser. No. 914,461.

A woven Zircar mixed oxide cloth (zirconium oxide-yttrium oxide mixture) produced by Zircar Products Inc. of Fla., New York showed promise as a candidate material for use as battery separators. However, the cloth is extremely fragile and exhibits very poor mechanical strength. Other inorganic cloths exhibit similar advantages and disadvantages.

PRIOR ART

The closest known prior art relating to attempts to improve the structural properties of an inorganic fabric by reinforcing it with an organic polymer is contained in U.S. Application Ser. No. 914,461, filed June 12, 1978 by Applicant Rogers herein, where polysulfone and other polymers are disclosed as effective reinforcing agents for a woven zirconium oxide-yttrium oxide cloth.

U.S. Application Ser. No. 914,461 teaches the application of the reinforcing polymer to a porous inorganic fabric via soaking the fabric in a polymer-solvent solution and subsequently removing the solvent by blotting and solvent evaporation.

While the prior art method of U.S. Application Ser. No. 914,461 yields a vastly improved separator material, the product has the disadvantage of reducing the wettability characteristics of the untreated fabric. The process employed was incapable of precluding excess polymer accumulation at the surface of the fabric.

Other prior art methods of applying reinforcing polymers to various structural materials and/or substrates such as spraying, painting, dip coating, molding and/or compressing proved to be ineffective in increasing the structural characteristics of porous inorganic cloths without decreasing the wettability of said materials.

Applicants know of no prior art process for reinforcing the structural strength of inorganic fabrics which does not result in a decrease in the wettability of the fabric.

Accordingly, it is therefore an objective of the invention disclosed below to provide a new and improved method for reinforcing the mechanical strength of inorganic fabrics and/or cloths in general and in particular to provide a new and improved method of reinforcing the mechanical strength of Zircar cloths.

A further objective of the invention is to provide a method of reinforcing the mechanical strength of inorganic fabrics without decreasing the wettability and electrolyte retention of said fabrics.

A still further objective of the invention is to provide a method for fabricating a gas permeable, alkali resistant, and thermally stable cloth suitable for use as an alkaline storage battery separator.

Additionally it is an objective of the invention to provide a process for fabricating an improved inorganic-organic material for use as a separator in alkaline storage batteries which exhibits all of the advantages of prior art materials while avoiding the disadvantages of prior art materials.

SUMMARY OF THE INVENTION

It has been discovered that polymers such as polysulfone and polybenzimidazole can be applied to a porous inorganic cloth by dispersing a solution of the polymer within the pores of the cloth and subsequently causing the polymers to precipitate out of the solution inside of the pores of the cloth followed by the removal of the solvent from said cloth by extraction.

When applied in the above-stated manner, the polymers reinforce the mechanical strength of the cloth or fabric without decreasing the wettability of the cloth or fabric.

DETAILED DESCRIPTION

Polymer reinforced Zircar cloths have shown promise as being best suited for use in the fabrication of separators for alkaline storage batteries. As discussed in the previous section of this application, said cloths have been reinforced with polysulfone (PS) and other polymers by an immersion, blotting and solvent evaporation method with a measure of success. However, this prior art technique yielded reinforced Zircar cloths exhibiting polymer rich surfaces that tended to reduce the wettability of the Zircar cloth.

In seeking to overcome the above-stated disadvantage of prior art processes for reinforcing Zircar and other fragile inorganic cloths, we have discovered that a precipitation process is very effective for reinforcing inorganic cloths without decreasing the wettability of the cloth.

The immersion of cloths, saturated with the polymer impregnation solution, in a solvent extractant such as hot water or alcohol causes polymer particles to be precipitated from the solution. The impregnation solvent is extracted by the water or alcohol which we refer to as the extractant or precipitant. Polymer particles so formed are thoroughly dispersed throughout the interstices of the cloth and adhere to the surface of the fibers forming the cloth.

The process begins with the preparation of a polymer-solvent impregnation solution for use as a porous cloth impregnant. Polymers such as polysulfone (PS), and polybenzimidazole (PBI) were dissolved in solvents such as dimethylformamide (DMF), dichloroethane (DCE), dimethylacetamide (DMA), dimethyl-sulfoxide (DMSO), chlorobenzene (CB), and tetrahydrofuran (THF) to form solutions having polymer-solvent concentrations ranging from as low as 2% weight/volume to as high as 12% weight/volume. Other polymers such as polybenzoxazole (PBO), polyether sulfone (PES), and polybenzothiazole (PBT) may be used by judiciously selecting the proper solvent.

A porous inorganic cloth, such as the woven fabric of zirconium oxide and yttrium oxide known as Zircar, is immersed in the polymer-impregnation solution and allowed to soak for approximately 15 minutes.

Ultrasonic vibration may be applied during the soaking period to rid the pores of the cloth of any air bubbles and thereby ensure complete saturation of the cloth with the polymer-impregnating solution.

After complete saturation has been achieved, the cloth is removed from the solution, and the excess solution is removed by allowing the cloth to drain, placing the saturated cloth on an absorbent pad and blotting under controlled compression for a specified time period. Physical parameters such as blotting time, temperature and compression are monitored and controlled to ensure reproducible results.

After removing the excess impregnant solution from the porous cloths, the impregnated cloth is quickly immersed in a solvent extractant or precipitant by holding the cloth by one edge such that the plane of the impregnated cloth makes about a 90° angle with the surface of the extractant or precipitant as it is immersed. This step causes polymer particles to be formed from the solution which adhere to and are uniformly dispersed throughout the inorganic cloth. The impregnated cloth should not be allowed to float in the extractant.

After allowing the cloth to vertically soak in the extractant or precipitant for approximately 15 minutes, the cloth is removed, allowed to drain and dried at temperatures not exceeding 100° C.

In the case of polymer-impregnation solutions comprising DMF, DMA, DCE, CB, DMSO or THF, the solvent extractant or polymer precipitant may be either water ($H_2O$) or methanol (MeOH). Other solvents such as acetone, low carbon chain alcohols and/or solvent mixtures $H_2O$ may be used as liquid extractants to extract the impregnation polymer solvent.

Woven Zircar cloths reinforced with polymers precipitated from impregnation solutions onto the surface and throughout the intersticies of the cloth as described above exhibit exceptional properties when compared to polymer reinforced Zircar cloths prepared by a solvent evaporation technique. For example: in addition to showing marked increases in the mechanical strength of the cloth there is a marked increase in the wettability of cloths prepared by the solvent precipitation method; the solvent precipitation method yields reinforced cloths which exhibit increased electrolyte retention; the cloths are as chemically resistant to KOH as untreated Zircar; and the polymer reinforced cloths are as gas permeable as untreated Zircar.

These characteristics are attributed to the formation of polymer particles which reinforce the inorganic fibers of the cloth rather than the formation of polymer films which completely coat the inorganic fibers of the cloth.

Slightly better electrolyte retention was observed in PS reinforced Zircar samples prepared by immersing the impregnated cloth in hot MeOH as compared to $H_2O$ immersion. However, these samples exhibited mechanical strengths slightly lower than samples prepared by hot $H_2O$ immersions. Therefore, when one considers the difference in the cost of the two materials, the preferred precipitant is $H_2O$.

The best results are obtained, insofar as providing a material suitable for use as a battery seperator is concerned, when Zircar is reinforced with an impregnating solution comprised of PBI dissolved in dimethylacetamide (DMA) and $H_2O$ is used as the extractant.

Specific examples of the technique found to be so effective for reinforcing porous inorganic cloths are shown below.

EXAMPLE I

Precipitation Method for Applying PS to Zircar (1) Prepare 7% polysulfone (PS) solution in dimethylformamide (DMF) by dissolving 7 grams of PS in 100 ml of DMF. Note: Handle DMF solutions in a well-ventilated hood and with protective gloves to avoid direct contact with your skin.

(2) Immerse the Zircar cloth into the PS solution in a proper size crystallizing dish or beaker. (There should be enough solution to cover the whole cloth). Cover the dish with parafilm or aluminum foil to minimize the evaporation of the solution.

(3) Place the dish with Zircar in an ultrasonic cleaner for 15 seconds to get rid of any air bubbles at the surface of the Zircar. (Note: This step may not be required.)

(4) Allow at least 15 minutes for the Zircar to be soaked.

(5) Take the Zircar out of solution using a pair of tweezers and drain the solution at the edge of the dish for a few seconds.

(6) Place the Zircar over a four-ply layer of Kimwipes for 5 seconds; then flip the Zircar over and wait another 5 seconds.

(7) Place the Zircar between two layers of Whatman No. 1 filter paper in a blotting box similar to that shown in FIG. 1 of U.S. Application Ser. No. 914,461. Blot the solution out of the Zircar by closing the box for 30 seconds.

(8) Take out the Zircar and immerse it quickly into hot (near 100° C.) water. Immerse it by holding one edge of the separator such that the plane of the separator makes about a 90° angle from the water surface. Quick immersion in this way is important because, if the separator floats over the water even for a short time, it results in nonuniform PS distribution through the thickness of the Zircar.

(9) After leaving the Zircar in the water for about 15 minutes, remove from the water and dry in an oven at about 90° C. for an hour. Do not let the temperature go about 100° C.

EXAMPLE II

Precipitation Method for Applying PBI to Zircar (1) Prepare a 9% weight/volume solution of polybenzimidazole (PBI) in dimethylacetamide (DMA) by dissolving 9 grams of PBI in 100 ml of DMA. Reflux for 48 hours and filter to remove undissolved particles of PBI.

(2) Immerse the Zircar cloth into the PBI solution in a proper size crystallizing dish or beaker. (There should be enough solution to cover the whole cloth). Cover the dish with parafilm or aluminum foil to minimize the evaporation of the solution.

(3) Place the dish with Zircar in an ultrasonic cleaner for 15 seconds to get rid of any air bubbles at the surface of the Zircar. (Note: This step may not be required.)

(4) Allow at least 15 minutes for the Zircar to be soaked.

(5) Take the Zircar out of solution using a pair of tweezers and drain the solution at the edge of the dish for a few seconds.

(6) Place the Zircar over a four-ply layer of Kimwipes for 5 seconds; then flip the Zircar over and wait another 5 seconds.

(7) Place the Zircar between two layers of Whatman No. 1 filter paper in a blotting box. Blot the solution out of the Zircar by closing the box for 30 seconds.

(8) Take out the Zircar and immerse it quickly into hot water (100°). Immerse it by holding one edge of the separator such that the plane of the separator makes about a 90° angle from the surface of the water. Quick immersion in this way is important because, if the separator floats over the water for a short time, it results in nonuniform PBI distribution through the thickness of the Zircar.

(9) After leaving the Zircar in the water for about 15 minutes, remove from the water and dry in an oven at about 90° C. for an hour.

EXAMPLE III

PRECIPITATION OF PS INTO ZIRCAR WITH METHANOL

Prepare a 7% PS solution as shown in Step 1 of Example I. Follow steps 2 through 7 of Example I. After removing the excess impregnation solution from the Zircar cloth, immerse the cloth in methanol in the manner taught by step no. 8 of Example I.

Remove the cloth from the methanol and dry as taught in step 9 of Example I.

While the examples teach the reinforcement of Zircar cloth with PS and PBI, the process is applicable to the reinforcement of other porous inorganic cloths with polymers and resins. It is particularly suitable for use in reinforcing brittle inorganic cloths because little or no stress is applied to the cloth during the impregnation process.

Having completely disclosed our invention, and provided teachings to enable others to utilize it, the scope of our claims may now be understood as follows:

What is claimed is:

1. A process for reinforcing a porous fragile inorganic fabric to increase its mechanical strength without inhibiting the flow of gases there through or decreasing the wettability of said fabric comprising the steps of:
    (a) first providing an impregnation solution of a thermosetting polymer and a strongly polar solvent;
    (b) immersing said fabric in said solution until said fabric is saturated with said solution;
    (c) removing said saturated fabric from said solution and blotting to remove excess solution from said fabric;
    (d) causing said polymer to precipitate inside of the pores of said fabric from said solution, by treating said impregnated fabric with a hot liquid extractant characterized by exhibiting the property of being miscible with said polar solvent and immiscible with said polymer, thereby forming polymer particles about the fibers of said fabric which reinforce but do not coat said fabric; and
    (e) removing said particle reinforced cloth from said liquid extractant and exposing said cloth to the drying action of hot air until dry.

2. The fabric reinforcement process of claim 1 wherein said fabric is a woven zirconium oxide cloth, said reinforcing polymer is selected from the group consisting of polysulfone, polybenzimidazole, polybenzoxazole, polyether sulfone, and polybenzothiazole, said polar solvent is selected from the group consisting of dimethylformamide, dichloroethane, dimethylacetamide, tetrahydrofuran, chlorobenzene and dimethylsulfoxide and wherein said extractant is selected from the group of solvents consisting of water, acetone, low carbon chain alcohols and water-solvent mixtures thereof.

3. The process of claim 2 wherein said reinforcing polymer is polysulfone and said extractant is selected from the group consisting of water and methanol.

4. The process of claim 2 wherein said polymer is polybenzimidazole and said extractant is water.

5. A process for preparing a high mechanical strength separator suitable for use in an alkaline storage battery such as nickel-cadmium and nickel-hydrogen space batteries characterized in that said separator is wettable with aqueous alkali solution and permeable by gases comprising the steps of:
    (a) providing a porous inorganic fabric selected from the group exhibiting chemical resistance to alkali solutions and good thermal stability.
    (b) saturating said fabric with an impregnation solution comprising a polymer selected from the group consisting of polysulfone, polybenzimidazole, polybenzoxazole and polybenzothiazole dissolved in a polar solvent;
    (c) removing any excess impregnation solution from said saturated fabric by blotting said saturated fabrics;
    (d) immersing said fabric into a hot extractant selected from the group of liquids consisting of water, low carbon chain alcohols, acetone and mixtures thereof thereby causing said polymer to precipitate from said solution and be retained as discontinuous polymer particles throughout the pores of said fabric while said polar solvent is absorbed by said extractant, and
    (e) causing said extractant containing said polar solvent to be removed from said fabric by exposing said fabric to an elevated temperature not to exceed 100° C. until dry.

6. The process of claim 5 wherein said fabric is a woven zirconium oxide cloth, said polymer is polybenzimidazole said polar solvent is dimethylacetamide, and said extractant is water.

7. The process of claim 5 wherein said fabric is a woven zirconium oxide cloth, said polymer is polysulfone, said polar solvent is dimethylformamide and said extractant is water.

8. A process for reinforcing woven zirconium-oxide-yttrium oxide fabrics to render said fabrics suitable for use as battery separators in alkali storage batteries intended for space applications where gases are evolved which must flow through said separators comprising the steps of:
    (a) first providing an impregnation solution of a polymer selected from the group consisting of polysulfone, polybenzimidazole, polybenzoxazole, polyether, and polybenzothiazole, and a strongly polar solvent;

(b) immersing said fabric in said solution until said fabric is saturated with said solution;

(c) removing said saturated fabric from said solution and blotting said fabric to remove excess solution from said fabric;

(d) immersing said fabric into a hot extractant selected from the group of the liquids consisting of water, low carbon chain alcohols, acetone and mixtures thereof thereby causing said polymer to precipitate from said solution and be retained throughout the pores of said fabric while said polar solvent is absorbed by said extractant; and (e) causing said extractant containing said polar solvent to be removed from said fabric by exposing said fabric to an elevated temperature not to exceed 100° C. until dry.

9. The process of claim 8 wherein said polymer is polybenzimidazole and said polar solvent is dimethylacetamide, and said extractant is water.

10. The process of claim 9 wherein said polymer is polysulfone, said polar solvent is dimethylformamide and said extractant is water.

* * * * *